3,310,112
WELL FRACTURING METHOD
Emery H. Nielsen, Wheatridge, Colo., and Lloyd V. Volkel, Vernal, Utah, assignors to The Dow Chemical Company, Midland, Mich., a corporation of Delaware
No Drawing. Filed Mar. 9, 1964, Ser. No. 350,587
10 Claims. (Cl. 166—42)

The invention is concerned with an improved method of fracturing fluid-bearing subterranean formations traversed by a well.

The amount of a fluid obtained without further treatment from a well penetrating a fluid-bearing formation usually falls off after a period of production. This period varies according to the characteristics of the formation and of the fluid being produced. To increase the rate of production and the period of production life of a well, well treatments, e.g., fracturing are widely practiced.

Fracturing briefly comprises injecting into a well penetrating a fluid-bearing formation, any liquid which, due to pressure it produces therein, causes fracturing of the strata in the formation thus opening up communicating passageways in the form of cracks, fissures, and the like between the wellbore and more remote portions of the fluid-bearing formation. A propping agent, e.g., sand, is often suspended in the fracturing liquid. The objective to be attained by the suspended propping agent is to aid in propping open the passageways thus produced and thereby to retain the benefits of the fracturing operation.

Hydraulic fracturing is conventionally carried out by employing an oil-base, aqueous-base, or emulsion-type liquid usually containing a suitable propping agent, which is injected down a well penetrating a formation to be fractured and back into the formation at sufficient pressure to attain the objectives set out above. When a liquid is so used it is reversed back out of the well or otherwise removed therefrom before regular recovery of the desirable fluid being produced by the well is resumed.

There is a desideratum in the well-fracturing practices for a method of fracturing which would require an appreciable lessening of the quantity of liquid which must be reversed or otherwise removed from a well following a fracturing treatment and the facilitation of removal of an appreciable portion of the liquids used. We have discovered an improved method of fracturing a formation penetrated by a well whereby fracturing is attained while employing a markedly reduced quantity of liquid and whereby the removal of any liquid employed is greatly facilitated.

The method of the invention employs liquid carbon dioxide as the principal fracturing fluid. It also employs a desirable quantity of propping agent, e.g., sand, glass beads, metal particles, hard resin particles, and the like, and usually a fluid loss preventative, e.g., finely ground silica known as silica flour, in aqueous liquids and the insoluble solids-sulfonate dispersing agent-agglutinant composition, described in U.S. Patent 2,779,735, in oil-base liquids.

The invention contemplates and embodies a method of fracturing a formation which comprises preparing a concentrated slurry of proping agent, and preferably also a fluid-loss preventative, in a suitable fluid vehicle; admixing the concentrated slurry so prepared with liquid carbon dioxide; injecting the resulting mixture down the wellbore of a well penetrating the formation to be fractured and back into the formation at fracturing pressures.

The suitable fluid vehicle employed to make the concentrated slurry may be any fluid which is liquid at atmospheric conditions, is substantially unreactive, and is not hazardous under the conditions of treatment, e.g., water, brines, crude oil, kerosene, naphtha, toluene, xylene, alcohols, alkyl and aryl organic compounds generally, and mixtures thereof which meet the requirements set out above. Particularly good results are obtained when the liquid employed in the preparation of the slurry is a gelled liquid, e.g., one containing admixed therewith a natural or synthetic gum, e.g., guar gum or polyacrylamide. If desired, spacer materials may be admixed with the propping agent to enhance the efficacy of the propping agent, among which are substances that dissolve or decompose after injection into the well, due to the conditions of the well, and are thereby removed from the deposited propping agent leaving spaces between the propping agent particles.

By reference to texts on the properties of carbon dioxide, e.g. pertinent sections of the International Critical Tables or Tables of Thermal Properties of Gases, U.S. Dept. of Commerce, National Bureau of Standards, circular 564 (1955, pages 138 to 200, suitable conditions for handling carbon dioxide at various well conditions of temperature and pressure can be ascertained.

The invention is carried out broadly as follows:

(1) The well to be treated, if not already provided with a string of tubing, is so provided. The well should be also provided with suitable piping and valve assemblies for regulating the flow in and from the well and conventional-type packers for positioning between the tubing and either the wellbore or the casing where the well being treated is a cased well.

(2) The packer is maintained in a released or open position and a liquid is injected either directly down the annulus or down the tubing and pushed back up into the annulus until the annulus is substantially filled, principally for the purpose of providing a weight of liquid to prevent upward thrust of the packer during subsequent treatment.

(3) A slurry comprising a propping agent in a suitable fluid vehicle, and preferably also containing a fluid-loss preventative, is then injected down the tubing, with the packer set or closed, simultaneously with liquid carbon dioxide, at such injection pressure that a mixture thereof is forced into the formation being treated. The injection pressure is conveniently recorded at the wellhead. Simultaneously injection may be attained by one of several ways among which are injecting the slurry and liquid carbon dioxide from separate supply lines into the well tubing, thereby effectuating mixing in the tubing and lower part of the wellbore; injecting the slurry and liquid carbon dioxide into a supply tank to effectuate premixing and thence into the well tubing; or injecting the slurry and liquid carbon dioxide into a common supply line leading to the wellhead. Sufficient liquid carbon dioxide should be employed to provide a ratio of at least about 5, and preferably at least about 7, volume units of carbon dioxide per volume of slurry.

(4) Injection of the liquid carbon dioxide and oil or water vehicle containing the propping agent, and preferably also a fluid preventative, is continued until one or more fractures have been created in the formation as evidenced by either a leveling off or a decline in the pressure recorded at the wellhead. The liquid carbon dioxide, while being injected, cools the formation surfaces being contacted below the critical temperature of carbon dioxide, i.e., below 88° F.

(5) After injection of the liquid carbon dioxide containing the propping agent, the pressure is released on the well. Since the temperature of most formations being treated is higher than the carbon dioxide critical temperature, the temperature of the carbon dioxide will soon be raised above its critical temperature after injection thereof ceases and will change to a gas. When a formation temperature is less than 88° F., the liquid carbon dioxide will change to a gas anyway upon release of the pressure. A substantial portion of the carbon dioxide then leaves the well of its own accord, i.e., without assistance, and forces or carries out with it an appreciable amount of oil or aqueous vehicle, employed in the treatment, from the fractures.

The following treatment is illustrative of the practice of the invention. It was carried out by fracturing a formation located in Washington County, Colorado. The formation was penetrated by a well having a depth of 5,168 feet, provided with a 5.5-inch diameter casing and a 2-inch diameter string of tubing. The casing was perforated at a depth of 5,108 to 5,114 feet at a fluid-producing interval. The well was provided with a conventional type packer positioned between the tubing and the casing at a depth of 5,050 feet. The well was a long-time producer with a declining production record. Just prior to treatment, it was producing an average of 90 barrels of oil and 200 barrels of water per day.

The treatment proceeded as follows:

(1) A fluid vehicle was prepared by admixing with water, 10 pounds of guar gum as a gelling agent, 40 pounds of silica flour as a fluid-loss preventative, and 2.1 tons liquid carbon dioxide (equivalent to about 36,000 cubic feet gaseous carbon dioxide, calculated at standard pressure and temperature) per 1000 gallons of water. This amount of carbon dioxide was in excess of that which was soluble in the aqueous liquid by about 30,000 cubic feet. The packer was closed and the fluid vehicle forced down the tubing and into the formation until a pressure greater than breakdown pressure was attained. About 70 barrels of fluid were thus used (an estimated tubing capacity of 20 barrels plus 50 barrels into the formation). The excess carbon dioxide insures return of a substantial portion of the fluid vehicle from the well.

(2) After injection of the admixed liquid carbon dioxide, guar gum, and silica flour aqueous composition, about 10 tons of liquid carbon dioxide was injected down the tubing of the well. A principal purpose for this additional injection was to cool the well further.

(3) An oil-base sand slurry, which had been prepared by admixing 2500 pounds of 20 to 40 mesh (U.S. Bureau of Standards Sieve Series) flint stone sand (obtained from deposits in the vicinity of Ottawa, Illinois) and 200 pounds of silica flour (as a fluid-loss preventative) with 500 gallons gelled kerosene (prepared by admixing a small amount of each of tall oil and an aqueous solution of NaOH with the kerosene in an amount of 1.5% of tall oil based on the weight of kerosene), was pumped into the well simultaneously with approximately 21.3 tons of liquid carbon dioxide. These amounts resulted in a proportion of about 0.5 pounds of sand per gallon of liquid carbon dioxide. As the resulting composition comprising kerosene, propping agent, silica flour, and carbon dioxide was injected down the tubing of the well, the ensuing turbulence in the tubing effected adequate mixing of the liquids.

(4) A composition, comprising about 2.1 tons of liquid carbon dioxide and 10 pounds of guar gum per 1000 gallons of water, was then injected down the tubing at a pressure sufficient to displace substantially all of the liquid carbon dioxide and sand slurry already injected, back into the formation at fracturing pressures. Fractures were indicated at the gauge pressure of 3000 pounds per square inch. The following total quantities of materials were used in the treatment:

40 tons of liquid carbon dioxide
2500 pounds of 20 to 40 mesh propping sand
500 gallons of gelled kerosene
150 barrels of gelled water
350 pounds of silica flour.

The pressure was then promptly released at the wellhead and an appreciable portion of the fluids injected during the treatment flowed back out of the well. Due to the conversion of an appreciable portion of the carbon dioxide present in the formation to gas, the amout of treating liquids remaining in the formation was very much less than that which remains after conventional fracturing and the clean-up of the well, in general, was superior.

The production from the well was shown to have been very satisfactorily improved. Production following treatment was 120 barrels of oil and 177 barrels of water per day. This was fully satisfactory because the well appeared to be reaching its later stages of economically acceptable production.

The above example illustrates but one mode of carrying out the invention. Variations thereof, as defined in the appended claims, are within the scope of the invention. Other propping agents, fluid-loss preventatives, and other formation conditioning agents and vehicles may be employed.

Having described our invention, what we claim and desire to protect by Letters Patent is:

1. The method of fracturing at least one fluid bearing stratum in a subterranean formation penetrated by a well which consists essentially of injecting down the well and back into the stratum, at fracturing pressure, a fluid composition comprising an intimate mixture of a particulate propping agent dispersed in a gelled liquid selected from the class consisting of aqueous and hydrocarbon liquids and emulsions thereof which have admixed therewith a gelling agent selected from the class consisting of synthetic polymers, natural gums, and carboxylic acid-alkali metal hydroxide reaction products in an amount sufficient to provide a gelled liquid slurry, and liquid carbon carbon dioxide in an amount sufficient to provide at least five volume units of liquid carbon dioxide per volume unit of said liquid slurry at fracturing pressure, and after said mixture has been injected, releasing the pressure at the well head whereby a substantial portion of the so injected gelled liquid is carried back out of the well by the carbon dioxide which, upon such release of pressure, tends to become a gas.

2. The method according to claim 1, wherein injection of the carbon dioxide-containing fluid composition is continued long enough to lower the temperature of surfaces of the formation contacted thereby to below the critical temperature of carbon dioxide during at least a part of the treating period.

3. The method according to claim 1 wherein the volume of liquid carbon dioxide to said liquid slurry is at least 7 volume units of liquid carbon dioxide per unit volume of said slurry at fracturing pressure.

4. The method according to claim 1 wherein said propping agent is largely 20 to 40 mesh flint sand.

5. The method according to claim 1 wherein the liquid carbon dioxide and said liquid slurry are admixed in the wellbore by injecting each from independent sources into the well at sufficient turbulence to effect mixing.

6. The method according to claim 1 wherein the liquid carbon dioxide and said liquid slurry are admixed in a common feed line leading to the well head from individual supply sources of each.

7. The method according to claim 1 wherein the liquid carbon dioxide and said liquid slurry are admixed in a mixing tank prior to being injected down the wellbore.

8. The method according to claim 1 wherein the wellbore is substantially filled with a substantially unreactive liquid prior to injection of the liquid carbon dioxide and said liquid slurry.

9. The method according to claim 1 wherein a substantially liquid displacing fluid is employed, following injection of the liquid carbon dioxide and said liquid slurry at fracturing pressure, to displace an additional portion of the carbon dioxide and said liquid slurry into the formation.

10. The method according to claim 1 wherein finely subdivided silica is admixed with said fluid composition in an amount sufficient to lessen fluid loss to the formation.

References Cited by the Examiner

UNITED STATES PATENTS

| | | | |
|---|---|---|---|
| 2,975,834 | 3/1961 | West et al. | 166—42.1 |
| 3,108,636 | 10/1963 | Peterson | 166—42.1 |
| 3,153,450 | 10/1964 | Foster et al. | 166—42.1 |
| 3,173,484 | 3/1965 | Huitt et al. | 166—42.1 |
| 3,237,690 | 3/1966 | Karp et al. | 166—33 |
| 3,237,693 | 3/1966 | Huitt et al. | 166—42.1 |

CHARLES E. O'CONNELL, *Primary Examiner.*

JACOB L. NACKENOFF, *Examiner.*

S. J. NOVOSAD, *Assistant Examiner.*